G. B. MORTON.
Sewing-Machine Casters.

No. 152,241. Patented June 23, 1874.

Witnesses
Geo. H. Borger
J. B. Holdersh.

Inventor.
George B. Morton
per R. S. & A. P. Lacey
Attorney

UNITED STATES PATENT OFFICE.

GEORGE B. MORTON, OF MEMPHIS, TENNESSEE.

IMPROVEMENT IN SEWING-MACHINE CASTERS.

Specification forming part of Letters Patent No. 152,241, dated June 23, 1874; application filed April 29, 1874.

*To all whom it may concern:*

Be it known that I, GEORGE B. MORTON, of Memphis, in the county of Shelby and State of Tennessee, have invented certain new and useful Improvements in Casters for Sewing-Machines; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to caster-wheels for tables, sewing-machines, and other articles of furniture; and has for its object to furnish a caster which shall remain constantly interposed between the table and the floor, and which may be rendered rigid or stationary by transferring the weight of the table from the axle to the circumference of the caster-wheel; and consists in the novel construction, arrangement, and attachment of the caster and swiveled plate to the shaft, and the operation thereof by means of suitable cam-levers, as will be hereinafter more fully set forth and described, reference being made to the accompanying drawings, which form a part of this application.

Figure 3:
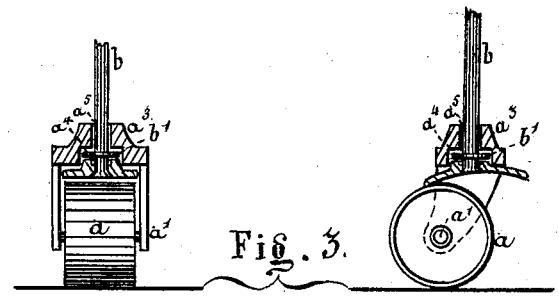
Figure 1:
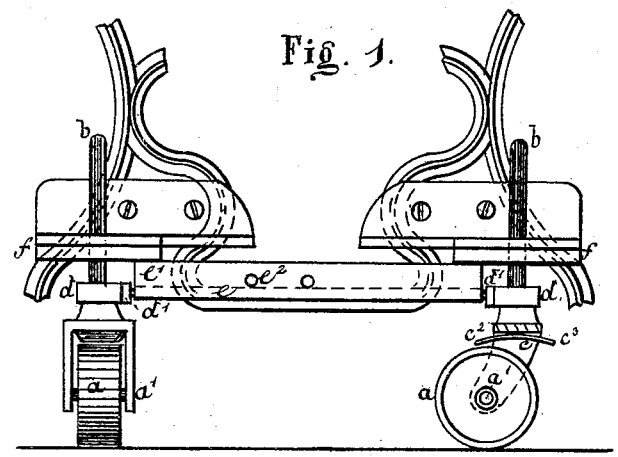
Figure 2:
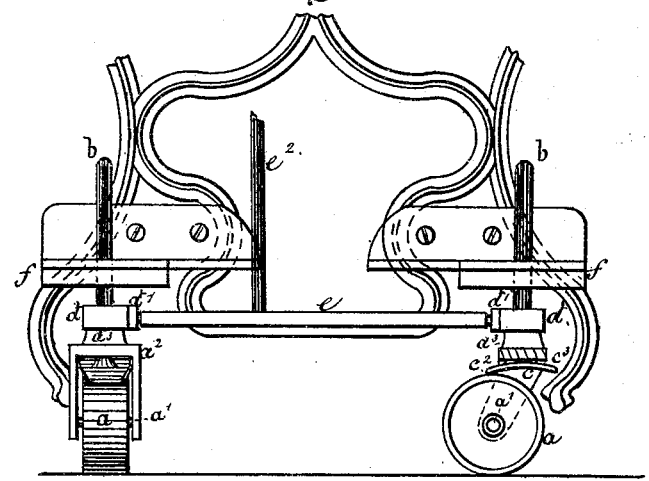

In the drawings, Figure 1 shows the weight of the table resting on the axles of the casters. Fig. 2 shows the table resting on the circumference of the casters; and Fig. 3 are sectional detail views of a caster with the weight of the table on the axle and on the circumference.

$a$ is the caster, and $a^1$ its axle. $a^2$ is the yoke of the caster, which has formed on its cross-plate the conical projection $a^3$, which has formed within it the recess or sleeve $a^4$ and round mortise $a^5$. $b$ is the swivel-shaft, on which the yoke $a^2$ and other devices hereafter mentioned turn. It passes through the mortise $a^5$ and extends slightly below the under side of the cross-plate of the yoke. It has firmly secured to it the boss or shoulder-piece $b'$, which is so constructed that the sleeve $a^4$ will move freely over it in the operation of the several devices. $c$ is a curved plate pivoted to the lower end of the shaft $b$, and fitting between the side plates of the yoke $a^2$, immediately above the caster-wheel, and so that it turns with the caster on the shaft. It has the enlarged portion $c'$, which is formed so as to fit and turn readily in the sleeve $a^4$, and which extends to and against the boss $b$. It has the extended arm $c^2$, which reaches out over the top of the caster-wheel, so that its end is vertical, or nearly vertical, to the axle $a^1$. $c^3$ is a rear lip or flange. $d$ is a cuff moving freely on the shaft $b$, above the yoke $a^2$. It is provided with a bearing or mortise in its side, in the projection $d'$. $e$ is a lever-arm, which extends between the pair of casters at the end of the table. It has the extended side or cam $e^1$ and operating-lever $e^2$, and is journaled in the cuffs $d$. $f$ is a bearing-plate, in which is rigidly fixed the shaft $b$, and against which the cam $e^1$ bears in the act of lifting the table off the circumference of the wheel. This may be so constructed as to be capable of attachment to the leg of the table in any desired position.

When my device is in the position shown in Fig. 1, the weight of the table rests on the axle of the caster, the table being supported through the medium of the cam $e^1$ bearing against the plate $f$, and thus raising the shaft $b$ and curved plate $c$, so as to permit the caster-wheel to turn free.

The cam being turned to a horizontal position, as in Fig. 2, the table descends and carries down the shaft $b$ and curved plate $c$. The end $c^2$, which is curved to correspond nearly with the curve of the wheel, is forced against the top of the wheel, where it is firmly held by the fixed boss $b'$ pressing on the top $c'$.

In this position, it will be seen that the yoke $a^2$ is entirely relieved, and the weight of the table is removed from the axle $a^1$ to the circumference of the wheel.

The weight of the table, resting on the curved plate $c$, which presses on the wheel, will render said wheel rigid and the table firm in position.

Having described my invention, what I claim, and desire to secure by Letters Patent, is—

1. The combination of the shaft $b$, having the boss $b'$ and curved plate $c$, with the caster $a$, as and for the purpose specified.

2. The combination, with the bearing-plate $f$, yoke $a^2$, and caster $a$, of the cuff $d$, lever-arm $e$, cam $e^1$, and operating-lever $e^2$, as and for the purpose set forth.

In testimony that I claim the foregoing as my own invention, I affix my signature in presence of two witnesses.

GEORGE B. MORTON.

Witnesses:
 JNO. M. CUNNINGHAM,
 M. L. WOODS.